United States Patent [19]

Cluff et al.

[11] Patent Number: 4,504,620

[45] Date of Patent: Mar. 12, 1985

[54] OXAZOLINE POLYESTER OLIGOMERS

[75] Inventors: Stephen L. Cluff, Baton Rouge, La.; Clifford H. Strolle, Springfield, Pa.

[73] Assignee: E. I. Du Pont de Nemours and Company, Wilmington, Del.

[21] Appl. No.: 600,966

[22] Filed: Apr. 16, 1984

[51] Int. Cl.³ .................. C08L 77/10; C08G 63/68
[52] U.S. Cl. .................................... 524/602; 525/437; 528/288; 528/289
[58] Field of Search ............... 528/288, 289; 525/437; 524/602

[56] References Cited

U.S. PATENT DOCUMENTS

| | | | |
|---|---|---|---|
| 3,932,358 | 1/1976 | deCleur et al. | 528/288 |
| 4,276,212 | 6/1981 | Khanna et al. | 260/39 R |
| 4,304,900 | 12/1981 | O'Neill | 524/602 |
| 4,330,458 | 5/1982 | Spinelli et al. | 524/512 |
| 4,331,800 | 5/1982 | Inata et al. | 528/289 |
| 4,375,528 | 3/1983 | Lange | 524/602 X |

Primary Examiner—Lucille M. Phynes

[57] ABSTRACT

Polyesters with oxazoline units, especially useful as additives to promote adhesion in crosslinked enamels.

10 Claims, No Drawings

OXAZOLINE POLYESTER OLIGOMERS

BACKGROUND OF THE INVENTION

A variety of coating compositions is used for the painting of automobiles, including lacquers and enamels. In general, lacquers have relatively high percentages of solvent and contain high molecular weight polymers. By contrast, enamels are based on low molecular weight polymers which require lower concentrations of solvent. In order to achieve equivalent protection using enamels, the molecular weight of the polymers used in enamels is increased through crosslinking. Typically, acid catalyzed reactions with melamine formaldehyde resins as crosslinking agents are used, in combination with elevated temperatures, for example, of about 250° F.

The use of enamel coatings in combination with appropriate crosslinking procedures provides finishes with outstanding appearance. However, the crosslinking can complicate the refinishing of a painted surface. Occasionally, the speed of automobile assembly lines is reduced due to mechanical or supply problems, resulting in unusually long exposure to the elevated temperatures used in curing the enamel coatings. This results in higher levels of crosslinking which do not effect the quality of finish itself, but, if refinishing is needed, either in the factory or afterwards, can interfere with adhesion of subsequently applied coatings. For this reason, in refinishing operations, the original finish is generally thoroughly sanded, to prevent failure of subsequently applied coatings.

With increasing concern over the disposition of the large quantities of organic solvent inherent in lacquer systems, the use of enamels in automobile manufacture has increased in recent years. A continuing need accordingly exists for enamel systems which, after curing, will exhibit adequate adhesion to subsequently applied coatings so that extensive sanding of the original finish is not necessary in refinishing operations.

SUMMARY OF THE INVENTION

The instant invention is based on the discovery of oxazoline polyester oligomers. These polyesters are particularly useful as additives for enamels, in that the addition of relatively small quantities to enamel formulations provides outstanding adhesion to subsequently applied coatings, regardless of the degree of crosslinking resulting from curing operations.

Specifically, the instant invention provides an oxazoline polyester having a molecular weight of about from 500 to 10,000 and prepared from (a) at least one monocarboxylic acid of up to 18 carbon atoms, (b) at least one dicarboxylic acid or anhydride having from 2 to 30 carbon atoms, (c) at least one glycol having up to 8 carbon atoms, and (d) a tris-hydroxyalkyl amino methane, the alkyl groups of which have from 1 to 3 carbon atoms, and wherein the resulting polyester contains about from 4 to 20% oxazoline units, based on the weight of polyester.

The instant invention further provides, in an enamel comprising film-forming polymer and solvent, the improvement wherein the enamel further comprises about from 1 to 20%, by weight of the polymer, of an oxazoline polyester as defined above.

DETAILED DESCRIPTION OF THE INVENTION

The present oligomers are prepared from monocarboxlic acids, dicarboxylic acids or anhydrides, glycols and tris-hydroxyakyl amino methane. The basic components of the polyester oligomer are the dicarboxylic acid or anhydride and the glycol.

Dicarboxylic acids which can be used in the preparation of the present oligomers include those having the general formula

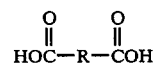

wherein R is a saturated aliphatic or an aromatic moiety of 2 to 30 carbon atoms. When R is aliphatic, it preferably has from 2 to 12 carbon atoms. When R is aromatic, it preferably has from 6 to 28 carbon atoms. Of these, aromatic dibasic acids are preferred, of which phthalic, iso-phthalic, terephthalic, uritic and cumidimic acids have been found to be particularly satisfactory. In addition, alicyclic dicarboxylic acids such as hexahydrophthalic anhydride and orthophthalic anhydride can be used.

The second basic component of the present polyesters is a branched-chain glycol. Preferably, the glycol contains less than 8 carbon atoms. Glycols that have been found to be particularly satisfactory include neopentyl glycol and pinacol.

A third component for the polyester oligomer, which is necessary for the formation of the oxazoline moiety, is tris-hydroxyalkyl amino methane, in which the alkyl groups have from 1 to 3 carbon atoms. Of these, tris-hydroxymethyl amino methane is preferred.

The ratios of the components used in the reaction mixture, in general, will be adjusted to provide the molecular weight desired in the final oligomer. The dicarboxylic acid should contain an aliphatic dibasic acid, but can also comprise an aromatic dibasic acid. When both aromatic and aliphatic dibasic acids make up this reaction component, the ratio of aliphatic to aromatic acids should be about from 100:0 to 10:90.

The balance of dibasic acid to glycol should be adjusted so that the average molecular weight of the oligomer does not exceed 10,000. The molecular weight of the polyester oligomer, for purposes of the present invention, is determined using gel permeation chromatography and a polystyrene sample, according to ASTM method D-3593-80.

The monocarboxylic acid components of the present oligomers are also present to control the molecular weight of the resulting oligomer. Accordingly, any aromatic or saturated aliphatic monocarboxylic acid, or mixtures of acids, having up to 18 carbon atoms can be used. Aromatic acids which can be used include benzoic acid, paratertiary butyl benzoic acid, triethylbenzoic acid, toluic acid, phenylacetic acid, and the like. Aliphatic acids which can be used include acetic acid, propionic acid, butyric acid, valeric acid, caproic acid, caprylic acid, pelargonic acid, capric acid, lauric acid, myristic acid, palmitric acid, stearic acid and mixtures thereof. Branched-chain aliphatic monocarboxylic acids can also be used. Particularly preferred monocarboxylic acids for use in the present invention include benzoic acid, lauric acid, t-butyl benzoic acid and pelargonic acid.

The quantity of mono-basic acid used in the present invention is adjusted according to the quantity of trishydroxyalkyl amino methane used to form the oligomer. Typically, a ratio of mono-basic acid to this component of about from 1:1 to 4:1 is used.

In the preparation of the oligomers of the present invention, the reactants are charged into a reaction vessel with heating, while removing the water of esterification by distillation through a packed column to a water separator filled with toluene. The reaction temperature will necessarily vary with the type and ratio of the ingredients, but will generally be about from 100° to 250° C.

Afer completion of the reaction, the reaction medium is generally cooled and additional solvent added for the purpose of reducing viscosity.

The resulting polyester has a molecular weight of about from 500 to 10,000, as measured by gel permeation chromatography using a polystyrene standard, and should have about from 4 to 20 percent by weight of oxazoline units. These units are characterized by the general formula

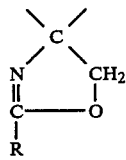

wherein R is generally a monobasic acid of up to 18 carbon atoms. R can also be derived from the dibasic acid used in the preparation of the present polyesters. In that case, the monobasic acids will function as chain terminators.

Enamel formulations using the present oligomers can be prepared from coating polymer and solvent according to the techniques well known in the art, and described in detail, for example, in Spinelli et al. U.S. Pat. Nos. 4,404,248 and 4,330,458 as well as Khanna U.S. Pat. No. 4,276,212, all hereby incorporated by reference. In general, the oxazoline oligomer should be present in the final enamel formulation to comprise about from 5 to 25% by weight of the acrylic resin.

The present oxazoline oligomers, when used as an enamel component as described above, markedly improve the recoat adhesion of enamels. In addition, such enamels result in markedly increased adhesion to polyisocyanate adhesives such as those used in automobile manufacture.

The invention is further illustrated by the following specific examples.

EXAMPLE 1

Polyester forming acids, glycols and anhydrides were charged into a reaction vessel, together with trishydroxymethyl amino methane and solvent, in the quantities specified in Table I. The reaction mixture was heated at a controlled rate and water of esterification was distilled through a packed column to a water separator filled with toluene. The reaction was maintained at 150° to 180° C. to complete the reaction, after which the batch was cooled to 110° C. and 445 grams of butyl alcohol was added.

TABLE I

| Ingredient | Moles | Grams |
|---|---|---|
| Toluene | — | 150 |
| t-Butyl Benzoic Acid | 3.2 | 569.6 |
| Trishydroxymethyl Amino Methane | 3.2 | 432.0 |
| Neopentyl Glycol | 12.8 | 1331.2 |
| Isophthalic Acid | 4.0 | 664.0 |
| O—phthalic Anhydride | 2.0 | 296.0 |
| Dodecanedioic Acid | 2.0 | 460.0 |

The product solution was evaluated according to standard procedures and found to exhibit the properties shown in Table II:

TABLE II

| Gallon Wt. | 8.81 pounds | |
|---|---|---|
| Gardner-Holdt Viscosity | Z-5 | |
| Solids | 71.4% by weight | |
| Acid No. | 21.3 | |
| Number Average Molecular Wt. | 370 | polystyrene standard, gel permeation chromatography |
| Weight Average Molecular Wt. | 1600 | |
| Polydispersity ($M_w/M_n$) | 4.4 | |

EXAMPLE 2

The general procedures of Example 1 were repeated, using the ingredients specified in Table III and, after completion of the reaction, adding 363.7 parts of toluene instead of the butyl alcohol used in Example 1.

TABLE III

| Ingredients | Grams |
|---|---|
| Toluene | 112.4 |
| Pelargonic Acid | 948.0 |
| Trishydroxyaminomethane | 786.0 |
| Azelaic Acid | 1128.0 |
| Trimethylol Propane | 268.0 |

The resin solution was evaluated as before and found to exhibit the properties shown in Table IV.

TABLE IV

| Gallon Wt. | 8.62 pounds | |
|---|---|---|
| Gardner-Holdt Viscosity | Z-½ | |
| Solids | 83.3% by weight | |
| Number average molecular weight | 370 | polystyrene standard, gel permeation chromatography |
| Weight average molecular weight | 1600 | |
| Polydispersity ($M_w/M_n$) = 4.4 | | |

EXAMPLE 3 AND CONTROL EXAMPLE A

In example 3 and Control Example A, enamels were prepared according to standard procedures, with and without the oxazoline polyester of the present invention. An acrylic resin was used prepared from styrene, butyl methacrylate, butyl acrylate, and hydroxyethyl acrylate in a weight ratio of 15/30/25/30. A dispersion acrylic resin was used prepared from 23.9% prepolymer, 12.1% dispersant, and 64.0% graft polymer. The prepolymer was prepared from styrene, butyl methacrylate, butyl acrylate, hydroxyethyl acrylate, acrylic acid and ethyl methacrylate in a weight ratio of 15/28/30/10/2/15. The dispersant was a copolymer of styrene, butyl methacrylate, butyl acrylate, hydroxyethyl acrylate, acrylic acid, ethyl methacrylate, and glycidyl methacrylate in a weight ratio of 14.6/27.3/29.2/9.7/2/14.6/2.6. The third component, the graft copolymer, was a copolymer of styrene, methyl acrylate, methyl methacrylate, hydroxyethylacrylate, methacrylic acid and glycidyl methacrylate in a ratio of 5/18/46.5/25/4/1.5. A blocked catalyst was used consisting of dodecyl benzene sulfonic acid and an equimolar quantity of dimethyl oxazolidine. The components were combined in the quantities, in parts by weight, specified in Table V.

TABLE V

|  | Example | |
| --- | --- | --- |
|  | 3 | Control A |
| Acrylic resin | 59.71 | 59.71 |
| Dispersion Acrylic Resin | 34.75 | 34.75 |
| Monsanto Resimere 751 | 38.55 | 38.55 |
| Oxazoline Polyester | 17.65 | 0 |
| Ciba-Geigy Tinuvin 900 | 2.00 | 2.00 |
| Ciba-Geigy Tinuvin CGL-079 | 2.50 | 2.50 |
| Blocked Catalyst | 2.50 | 2.50 |
| Aromatic Hydrocarbon (bP 150-155° C.) | 20.40 | 24.00 |
| Butanol | 7.60 | 6.00 |

The enamels were used to paint 4 inch by 12 inch steel panels. The panels were first primed and then coated with a silver base coat at 0.7 mil thickness. The clear enamels prepared above were applied by spraying at a thickness of 1.8 to 2.0 mils and baked for 45 minutes at 280° F. This baking or curing time is typical of excessive curing that would result from a slowdown or stoppage in an automobile assembly line, and would result in excessive crosslinking in a typical enamel composition. A second coat of each composition was applied at a thickness of 1.8 to 2.0 mils and baked for 35 minutes at 250° F.

The coated panels were evaluated, and the panel coated with the composition of Control Example A exhibited poor adhesion between the first and second coats and could be chipped off with a knife or coin. By contrast, the panel coated with the composition of Example 3 exhibited excellent adhesion and appearance between the two coats of enamel.

We claim:

1. An oxazoline polyester having a molecular weight of about from 500 to 10,000 and prepared from (a) at least one monocarboxylic acid of up to 18 carbon atoms, (b) at least one dicarboxylic acid or anhydride having from 2 to 30 carbon atoms, (c) at least one glycol having up to 8 carbon atoms, and (d) a tris-hydroxyalkyl amino methane, the alkyl groups of which have from 1 to 3 carbon atoms, and wherein the resulting oligomer contains about from 4 to 20% oxazoline units, based on the weight of the polyester.

2. An oxazoline polyester of claim 1 wherein the monocarboxylic acid is selected from the group consisting of benzoic acid, lauric acid, t-butyl benzoic acid and pelargonic acid.

3. An oxazoline polyester of claim 1 wherein the dicarboxylic acid is an aliphatic dicarboxylic acid having from 2 to 12 carbon atoms.

4. An oxazoline polyester of claim 3 wherein the dicarboxylic acid further comprises aromatic dicarboxylic acid, and wherein the ratio of aliphatic to aromatic acids is about from 100:0 to 10:90.

5. An oxazoline polyester of claim 1 wherein the glycol is selected from the group consisting of neopentyl glycol and pinacol.

6. An oxazoline polyester of claim 1 wherein the tris-hydroxyalkyl amino methane is tris-hydroxymethyl amino methane.

7. In an enamel comprising film-forming polymer and solvent, the improvement wherein the enamel further comprises about from 1 to 20%, by weight of the polymer, of an oxazoline polyester having a molecular weight of about from 500 to 10,000 and prepared from (a) at least one monocarboxylic acid of up to 18 carbon atoms, (b) at least one dicarboxylic acid or anhydride having from 2 to 30 carbon atoms, (c) at least one glycol having up to 8 carbon atoms, and (d) a tris-hydroxyalkyl amino methane, the alkyl groups of which have from 1 to 3 carbon atoms, and wherein the resulting oxazoline polyester contains about from 4 to 20% oxazoline units, based on the weight of the oxazoline polyester.

8. An enamel of claim 7 in which the film forming polymer comprises at least about 50% by weight of the enamel.

9. An enamel of claim 7 wherein the film forming polymer comprises up to about 50% by weight of the enamel.

10. An enamel of claim 9 wherein the enamel further comprises about 0.1 to 30% by weight, based on the weight of the coating composition, of pigment.

* * * * *